(12) United States Patent
Ishida et al.

(10) Patent No.: US 6,565,298 B2
(45) Date of Patent: May 20, 2003

(54) ECCENTRIC FACING UNIT

(75) Inventors: Yoshitaka Ishida, Shiga (JP); Mikio Hashii, Shiga (JP)

(73) Assignee: Yamashina Seiki Co., Ltd., Shiga (JP)

( * ) Notice: Subject to any disclaimer, the term of this patent is extended or adjusted under 35 U.S.C. 154(b) by 0 days.

(21) Appl. No.: 09/992,118

(22) Filed: Nov. 5, 2001

(65) Prior Publication Data

US 2002/0189412 A1 Dec. 19, 2002

(30) Foreign Application Priority Data

Jun. 13, 2001 (JP) ........................................ 2001-177889

(51) Int. Cl.[7] .................. B23C 1/02; B23B 41/04; B23B 41/00
(52) U.S. Cl. ...................... 409/200; 82/1.3; 82/1.2
(58) Field of Search ........................... 219/69.2; 82/1.2, 82/1.4, 1.5, 82, 86, 88; 408/148, 150; 409/200

(56) References Cited

U.S. PATENT DOCUMENTS

| | | | | | |
|---|---|---|---|---|---|
| 3,740,160 A | * | 6/1973 | Kimura et al. | ............. | 408/2 |
| 3,757,474 A | * | 9/1973 | Pedersen | ............. | 451/123 |
| 5,307,885 A | * | 5/1994 | Kuwana et al. | ............. | 175/26 |
| 5,482,415 A | * | 1/1996 | Belaga et al. | ............. | 409/200 |
| 5,539,172 A | * | 7/1996 | Takase et al. | ............. | 219/69.2 |
| 5,694,819 A | * | 12/1997 | Hormansdorfer | ............. | 82/19 |
| 6,227,082 B1 | * | 5/2001 | Hormansdorfer et al. | .... | 82/1.11 |
| 2001/0015115 A1 | * | 8/2001 | Hoermansdoerfer | ............. | 82/1.3 |

* cited by examiner

Primary Examiner—Daniel W. Howell
Assistant Examiner—Brian D. Walsh
(74) Attorney, Agent, or Firm—Morgan & Finnegan, LLP

(57) ABSTRACT

An eccentric facing unit wherein a tool driving shaft is concentrically disposed in a spindle for relative rotation with respect to the spindle. A tool-shaft supporting shaft is eccentrically disposed in a spindle and is connected with the tool driving shaft through a geared transmission so as to rotate at speed two times faster than that of the tool driving shaft. A tool shaft is eccentrically disposed in the tool-shaft supporting shaft in an eccentricity equal to that of the tool-shaft supporting shaft with respect to the spindle and is connected through an Oldham's shaft coupling with the tool driving shaft for integral rotation therewith.

2 Claims, 3 Drawing Sheets

ECCENTRIC FACING UNIT

FIELD OF THE INVENTION

The present invention relates to an improvement in an eccentric facing unit or head in which a tool shaft or a facing tool holding shaft is disposed eccentrically with respect to a spindle.

DESCRIPTION OF THE RELATED ART

This kind of eccentric facing unit is well known, wherein the tool shaft relatively rotates with respect to the spindle during rotation thereof so as to change a radial distance or radial displacement stroke of a cutting edge (cutting blade) of a facing tool from the axis of the spindle to thereby carry out the facing.

The well known eccentric facing unit is advantageously comprised of only a rotary shaft system, which is easy to attain an ideal balance or balance in two axially spaced planes because all of centrifugal forces can be received or supported by bearings not so as to be transmitted to a driving system and the like of the unit.

However, this eccentric facing unit has a disadvantage in a change or fluctuation of a rake angle (and a cutting angle) of the cutting edge which results in changes of the cutting resistance, the cutting temperature, the surface roughness and the like. Further, in the eccentric facing unit, the larger the radial displacement stroke of the cutting edge becomes, the more the rake angle thereof changes. Accordingly the use of this eccentric facing unit is limited to the facing of a small radial displacement stroke of the cutting edge in which the change of the rake angle is extremely small.

SUMMARY OF THE INVENTION

It is therefore an object of the present invention to provide an eccentric facing unit comprising only a rotary shaft system, which has a constant rake angle of a cutting edge.

An eccentric facing unit according to the present invention includes a tool driving shaft, a tool-shaft supporting shaft and a tool shaft. The tool driving shaft is concentrically disposed in a spindle and is relatively rotating with respect to the spindle during rotation thereof. The tool-shaft supporting shaft is eccentrically disposed in the spindle and is connected with the tool driving shaft through a geared transmission so as to rotate at speed twice or two times faster than that of the tool driving shaft. The tool shaft integrally rotating with the tool driving shaft at the same speed, is eccentrically disposed in the tool-shaft supporting shaft in an eccentricity equal to that of the tool-shaft supporting shaft with respect to the spindle.

The basic concept or principle of the eccentric facing unit according to the present invention is schematically shown in FIG. 1. Point P corresponding to the axis of the tool-shaft supporting shaft is disposed apart from point O corresponding to the axis of the spindle and point Q corresponding to the axis of the tool shaft is disposed apart from point P at a equal distance respectively, and point R apart from point Q corresponds to a tip of cutting edge of a facing tool, and when segment PQ belonging to the tool-shaft supporting shaft rotates an angle of θ around point P so that point Q moves to point Q' through the tool driving shaft, segment QR belonging to the facing tool rotates an angle of θ/2 around point Q so as to extend as segment Q'R' through the tool driving shaft.

In such a construction, the extension of segment Q'R' always passes through point O, that is, the face rectangular to the cutting direction of the cutting edge always passes through the axis of the spindle, thereby keeping the rake angle of the cutting edge permanently constant.

The tool shaft is preferably connected with the tool driving shaft through an Oldham's shaft coupling. This Oldham's shaft coupling makes possible the accurate compensation of the working errors on eccentricities of the tool-shaft supporting shaft and the tool shaft, in other words, the working errors on distances from the axis of the spindle to that of the tool-shaft supporting shaft and from the axis of the tool-shaft supporting shaft to that of the tool shaft.

As mentioned above, the eccentric facing unit of the invention keeps the rake angle of the cutting edge always constant, so that the stable facing, in which the cutting resistance, the cutting temperature, the surface roughness or the like are substantially constant, is performable.

The eccentric facing unit can attain an ideal balance, that is, balance in two axially spaced planes because of being comprised of only a rotary shaft system.

Furthermore, the eccentric facing unit is simple in construction and can be manufactured at low cost, and can also be incorporated into an automatic tool changer in machining center to apply for the high speed boring and recessing work.

Other objects, features and advantages of the invention will become more apparent from the following description taken in connection with the accompanying drawings.

DESCRIPTION OF THE ILLUSTRATIVE EMBODIMENT

Figure 3:
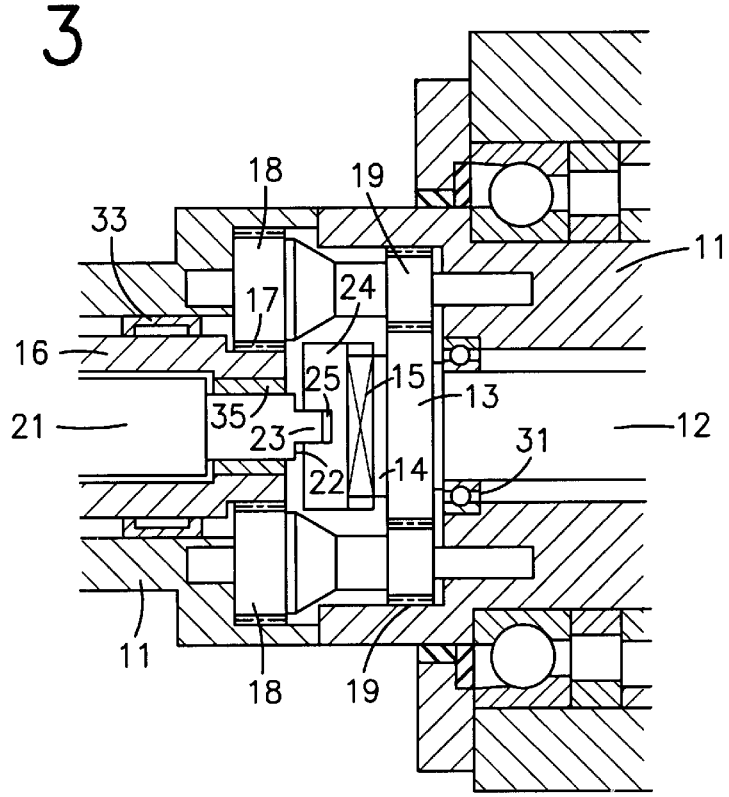
FIG. 3 is a schematic sectional plan view of the embodiment shown in FIG. 2.
Figure 2:
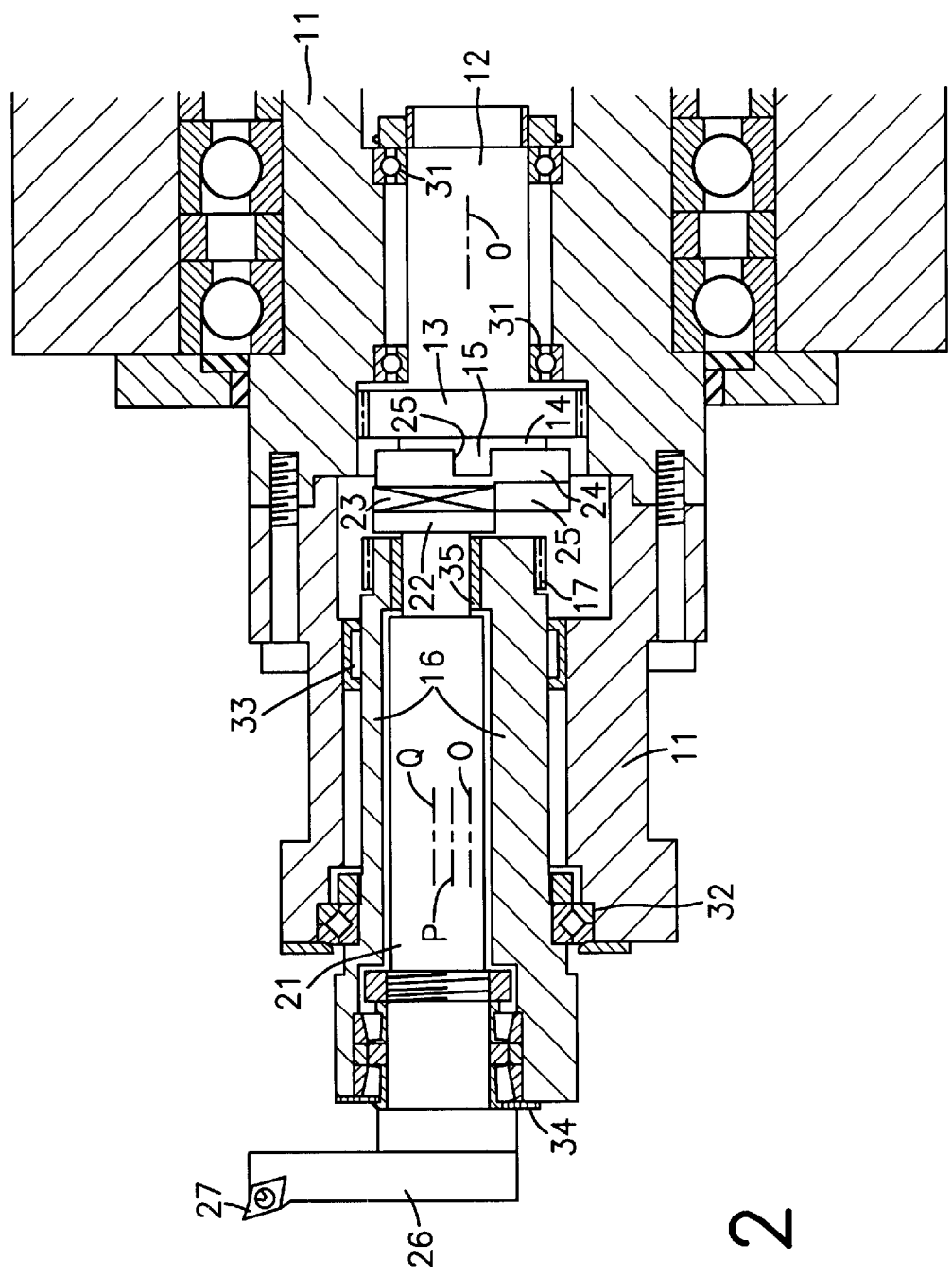
FIG. 2 is a schematic sectional elevation view of an embodiment of the eccentric facing unit of the invention.
Figure 4:
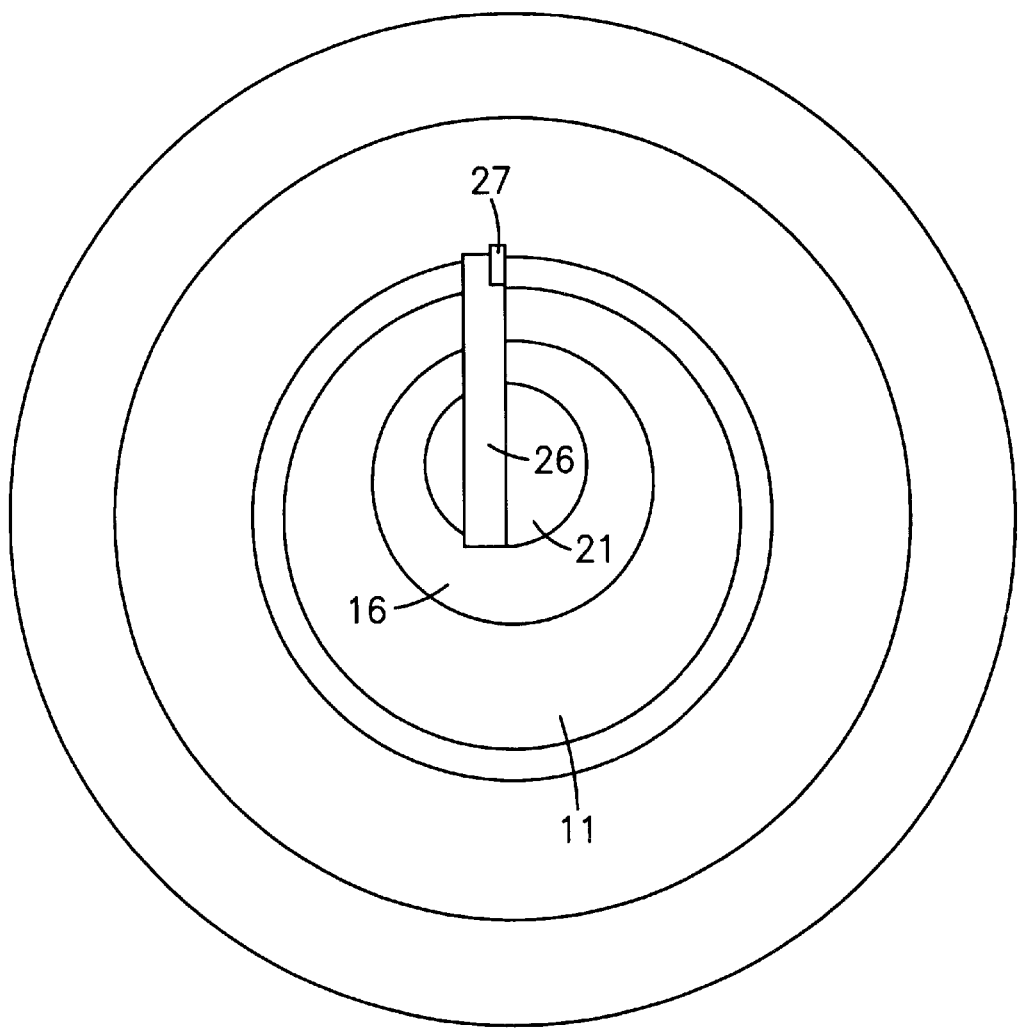
FIG. 4 is a schematic left side view of the same.

Referring to particularly FIGS. 2, 3 and 4, a tool driving shaft 12 is rotatably and concentrically inserted and supported in a spindle 11, whose axis is designated by O in FIG. 2, through a bearing 31 for relative rotation with respect to the spindle 11 during rotation thereof.

A tool-shaft supporting shaft 16 whose axis is indicated by P in FIG. 2 is rotatably inserted and supported in the fore end portion of the spindle 11 through a roller bearing 32 and a needle bearing 33 and eccentrically with respect to the spindle 11.

A tool shaft 21, whose axis is designated by Q in FIG. 2, is rotatably inserted and supported in the tool-shaft supporting shaft 16 through a roller bearing 34 and a bearing metal 35 and eccentrically with respect to the shaft 16 in eccentricity equal to that of the shaft 16 with respect to the spindle 11.

The tool driving shaft 12 is provided at the fore end thereof with a driving gear 13, and at the fore end side thereof is attached an Oldham's shaft coupling hub (boss) 14 having a projection 15.

The tool-shaft supporting shaft 16 is provided at the rear end with a driven gear 17 connected to the driving gear 13 of tool driving shaft 12 through a pair of intermediate gears 18 and 19. The gear transmission from the tool driving shaft 12 to the tool-shaft supporting shaft 16 rotates the tool-shaft supporting shaft 16 at speed twice that of the tool driving shaft 12.

The tool shaft 21 holds at the fore end thereof a facing tool 26 having a cutting edge 27. Also, the tool shaft 21 is provided at the rear end thereof with an Oldham's shaft coupling hub 22 having a projection 23 and connecting with the Oldham's shaft coupling hub 14 through an Oldham's shaft coupling intermediate member 24 having a projection 25. The Oldham's shaft coupling connects the tool shaft 21 and the tool driving shaft 12 so as to integrally rotate at the same speed.

Figure 1:
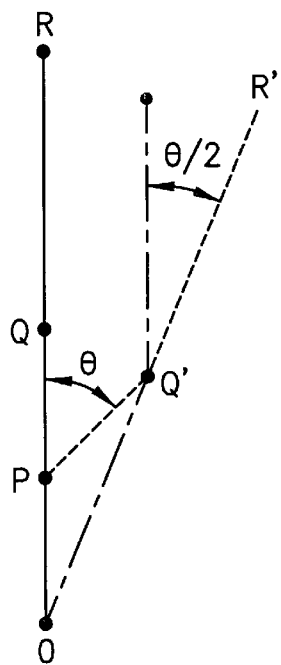
FIG. 1 is a view diagrammatically illustrating the basic concept of an eccentric facing unit according to the present invention.

In the illustrative embodiment, as described on the basis of FIG. 1, when the tool-shaft supporting shaft 16 rotates an angle of θ with respect to the spindle 11 through the tool driving shaft 12 and the geared transmission including the drive gear 13, the driven gear 17 and the intermediate gear 18 and 19, the tool shaft 21 rotates an angle of θ/2 with respect to the tool-shaft supporting shaft 16 through the Oldham's coupling so that the face perpendicular to the cutting direction of cutting edge 27 always passes through axis O of the spindle 11, namely the rake angle of the cutting edge 27 is always constant.

While the invention has been shown and described with reference to an illustrative embodiment thereof, it will be understood by those skilled in the art that various changes and modifications may be made without departing from the spirit and scope of the invention which is to be determined by the following claims.

What is claimed is:

1. An eccentric facing unit including a tool driving shaft concentrically disposed in a spindle and relatively rotating with respect to said spindle, a tool-shaft supporting shaft eccentrically disposed in said spindle and connected with said tool driving shaft through a geared transmission so as to rotate at speed twice that of said tool driving shaft, and a tool shaft integrally rotating with said tool driving shaft and eccentrically disposed in said tool-shaft supporting shaft in an eccentricity equal to that of said tool-shaft supporting shaft with respect to said spindle.

2. An eccentric facing unit as claimed in claim 1, wherein said tool shaft is connected with said tool driving shaft through an Oldham's shaft coupling.

\* \* \* \* \*